(12) United States Patent
Jung et al.

(10) Patent No.: US 10,066,125 B2
(45) Date of Patent: Sep. 4, 2018

(54) LIGNIN-CONTAINING COATING COMPOSITION AND ULTRAFINE FIBERS INCLUDING THE SAME

(71) Applicant: Korea Institute of Science and Technology, Seoul (KR)

(72) Inventors: Yong Chae Jung, Wanju-gun (KR); Eun Sil Lee, Wanju-gun (KR); Daun Lim, Wanju-gun (KR); Cheol-Min Yang, Wanju-gun (KR); Jaesang Yu, Wanju-gun (KR); Seong Yun Kim, Wanju-gun (KR); Junyeon Hwang, Wanju-gun (KR); Hun-su Lee, Wanju-gun (KR); Min Park, Wanju-gun (KR)

(73) Assignee: Korea Institute of Science and Technology, Seoul (KR)

( * ) Notice: Subject to any disclaimer, the term of this patent is extended or adjusted under 35 U.S.C. 154(b) by 56 days.

(21) Appl. No.: 15/156,644

(22) Filed: May 17, 2016

(65) Prior Publication Data

US 2017/0121559 A1 May 4, 2017

(30) Foreign Application Priority Data

Oct. 28, 2015 (KR) .................. 10-2015-0149929

(51) Int. Cl.
*C09D 197/00* (2006.01)
*C08K 3/04* (2006.01)
*C08L 29/04* (2006.01)

(52) U.S. Cl.
CPC .............................. *C09D 197/005* (2013.01)

(58) Field of Classification Search
CPC .................................................. C09D 197/005
(Continued)

(56) References Cited

U.S. PATENT DOCUMENTS

| 2011/0285049 A1 | 11/2011 | Baker et al. |
| 2014/0349536 A1 | 11/2014 | Jo et al. |

(Continued)

FOREIGN PATENT DOCUMENTS

| KR | 20-0328366 Y1 | 9/2003 |
| KR | 10-1177298 B1 | 8/2012 |

(Continued)

OTHER PUBLICATIONS

Rochez, Olivier, et al. "Dispersion of Multiwalled Carbon Nanotubes in Water by Lignin." Journal of Materials Science 48.14 (2013): 4962-4964.

(Continued)

*Primary Examiner* — David T Karst
(74) *Attorney, Agent, or Firm* — NSIP Law

(57) ABSTRACT

Disclosed is an ultrafine fiber including lignin, a carrier polymer and a carbon material. The ultrafine fiber, which includes lignin, can exhibit the properties of lignin such as antibacterial property, biodegradability, etc. Accordingly, it can be used widely in medical materials such as nanofiber, nanofiber web, nanofiber sheet, etc. for wound healing of the skin's dermal layer. Also, the ultrafine fiber can be used in sheath of electric cables because it contains a carbon material and has superior conductivity. In addition, because the ultrafine fiber can hold a large quantity of water, it can be used in various fields including sanitary pads for women, diapers for babies and adults, etc.

5 Claims, 10 Drawing Sheets

(58) Field of Classification Search
USPC .......................................... 523/456; 524/528
See application file for complete search history.

(56) References Cited

U.S. PATENT DOCUMENTS

| | | |
|---|---|---|
| 2015/0017528 A1 | 1/2015 | Roberts et al. |
| 2015/0292118 A1 | 10/2015 | Korzhenko et al. |

FOREIGN PATENT DOCUMENTS

| | | |
|---|---|---|
| KR | 10-2013-0071836 A | 7/2013 |
| KR | 10-2014-0057450 A | 5/2014 |

OTHER PUBLICATIONS

Lee, Eun Sil "Fabrication of Lignin Nanofibers and Evaluation of the Antimicrobial Property and Biodegradability", The Graduate School of Yonsei University, Dept. of Clothing and Textiles, 2014. (pp. 1-104 in Korean, pp. 105-107 in English).

Grzegorz Milczarek, et al., "Carbon nanotubes/kraft lignin composite: Characterization and charge storage properties," *Material Research Bulletin*, vol. 48, 2013, pp. 4032-4038.

Nai-yu Teng et al, "Incorporation of Multiwalled Carbon Nanotubes into Electrospun Softwood Kraft Lignin-Based Fibers," *Journal of Wood Chemistry and Technology*, vol. 33, 2013, pp. 299-316.

Lee, Eun Sil, "Fabrication of lignin nanofibers and evaluation of the antimicrobial property and biodegradability" *Yonsei University*, 2014 (3 pages in English and 107 pages in Korean).

LIGNIN-CONTAINING COATING COMPOSITION AND ULTRAFINE FIBERS INCLUDING THE SAME

CROSS-REFERENCE TO RELATED APPLICATION

This application claims the priority of Korean Patent Application No. 10-2015-0149929, filed on Oct. 28, 2015, and all the benefits accruing therefrom under 35 U.S.C. § 119, the contents of which in its entirety are herein incorporated by reference.

BACKGROUND

1. Field

The present disclosure relates to a lignin-containing coating composition and an ultrafine fiber including the same. More particularly, it relates to a coating composition having various properties such as antibacterial property, conductivity, biodegradability, etc., an ultrafine nanofiber including the same and a method for preparing the same.

[Description about Government-Sponsored Research and Development]

This research was supervised by the Korea Atomic Energy Research Institute and sponsored by the Research Council of Science & Technology of the Ministry of Science, ICT and Future Planning of Korea. The project name was "Development of waste wood- and plant resource-based pulping and fiber formation technology using radiation" (2N44040) (project number: 1711021929).

2. Description of the Related Art

Lignin, which is a natural polymer compound together with cellulose and hemicellulose, is an oil-soluble phenolic polymer present in the cell wall of woody plants such as conifers or broadleaf trees. Lignin fills the space in the cell wall between cellulose and hemicellulose and acts as a glue. In general, it accounts for about 15-30% of dry wood by weight and plays an important role in the survival of trees by increasing the mechanical strength of woody tissue, providing resistance to attack by microorganisms, etc. However, lignin has been considered as a waste in the meantime. Because the chemical structure of lignin changes easily during the recovery process, most of lignin is recycled as a fuel in the pulping process. Lignin is difficult to hydrolyze with an acid because of its amorphous structure. Chemically, lignin is composed of phenylpropanoid units condensed by carbon-carbon or ether bonds.

Recently, as environment-friendly and renewable resources are pursued by consumers, companies and the government, interests are increasing in lignin which is abundant but has not been utilized effectively. In addition, with increasing importance of biomass as a source of bioenergy, interests are increasing in the control of lignin content in biomass using enzymes involved in lignin biosynthesis and molecular biological techniques as well as in lignin fiber formation and lignin encapsulation.

In particular, the natural polyphenol compound lignin, which is obtained as a byproduct in the pulping process, is drawing attentions because of its antibacterial and antioxidant properties originating from its structural characteristics. Lignin destroys microorganisms by damaging the cell membrane. The contents of the destroyed cells kill bacteria by exhibiting antibacterial property. Also, organic pollutants can be removed by adsorption using the microstructure of lignin. In addition, lignin can exhibit antioxidant effect because it can stabilize free radicals by proving hydrogen atoms. Due to these excellent properties, lignin is expected to be applicable as wound dressing, cellular scaffold, etc.

Carbon nanotube is a structure wherein a graphene layer is rolled into a cylindrical shape. Due to superior physical, chemical, electrical and mechanical properties, it is drawing a lot of attentions as a 1-dimensional nanomaterial applicable to various fields. However, there are many limitations in application due to the strong cohesive property of the nanomaterial. To solve this problem, methods for noncovalent functionalization using various dispersants, polymers, DNAs, proteins, etc. are suggested. In particular, methods for stabilizing and effectively controlling the dispersibility of carbon nanotube in solvents using lignin are being studied.

Electrospinning is used to form a nanofiber web, which is flexible, ultrathin and ultralight and has micropores and, therefore, can exhibit functionalities on large surface areas in various forms. However, because lignin is not suitable for electrospinning due to low viscosity, it can be mixed with PVA to be electrospun into a nanofiber web.

REFERENCES OF THE RELATED ART

Non-Patent Documents (Non-patent document 1) Preparation of electrospun lignin nanofiber and evaluation of antibacterial property and biodegradability, Yonsei University master's thesis, 2014, Eunsil Lee.

SUMMARY

The present disclosure is directed to providing a lignin-containing coating composition having superior antibacterial property, dispersibility, biodegradability, etc. and an ultrafine fiber including the same.

The present disclosure is also directed to providing a multifunctional ultrafine fiber including lignin and a carbon material, which has superior antibacterial property, biodegradability and electrical property, and a method for preparing the same.

In an aspect, the present disclosure provides a coating composition containing lignin and a carbon material.

In an embodiment, the carbon material may be coated with the lignin.

In an embodiment, the carbon material may include one or more selected from a group consisting of carbon nanotube, graphene, fullerene, boron nitride (BN) nanotube, graphite, expanded graphite, carbon fiber and carbon black.

In an embodiment, the carbon nanotube may include one or more selected from a group consisting of single-walled carbon nanotube, double-walled carbon nanotube and multi-walled carbon nanotube.

In an embodiment, the carbon nanotube may have a diameter of 1-100 nm.

In an embodiment, a weight ratio of the lignin and the carbon material may be 200:1 to 3:2.

In an embodiment, the coating composition may further contain an organic binder and the organic binder may include one or more selected from a group consisting of ethyl cellulose, polyurethane, epoxy, nitrocellulose, phenol resin, polyester, polyvinyl, urea resin, polyethylene resin, acryl resin, silicone resin and a mixture thereof.

In another aspect, the present disclosure provides a method for preparing a coating composition, which includes: a step of preparing a dispersion by adding lignin and a carbon material to a solvent; and a step of preparing the coating composition by ultrasonicating the dispersion.

In another aspect, the present disclosure provides an ultrafine fiber including lignin, a carrier polymer and a carbon material.

In an embodiment, a weight ratio of the lignin, the carrier polymer and the carbon material may be 1:0.001:1 to 1:0.01:1.

In an embodiment, the lignin and the carbon material may be bound to the carrier polymer.

In an embodiment, the ultrafine fiber may have a structure wherein the lignin and carbon material are present in the carrier polymer.

In an embodiment, the ultrafine fiber may be formed from spinning of a spinning solution containing the lignin, the carrier polymer and the carbon material.

In an embodiment, the carrier polymer may include one or more selected from a group consisting of polyvinyl alcohol (PVA), polylactic acid (PLA), polyglycolic acid (PGA), a poly(lactic-co-glycolic acid) (PLGA) copolymer, chitosan and a mixture thereof.

In an embodiment, the carbon material may include one or more selected from a group consisting of carbon nanotube, graphene, fullerene, graphite, expanded graphite, carbon fiber and carbon black.

In an embodiment, the carbon material may be carbon nanotube and the carbon nanotube may have a diameter of 1-100 nm.

In an embodiment, the ultrafine fiber may have a thickness of 150-3000 nm.

In an embodiment, the carbon material may be carbon nanotube and the antibacterial property of the ultrafine fiber may increase with the concentration of the carbon nanotube.

In another aspect, the present disclosure provides a method for preparing an ultrafine fiber which includes: a step of preparing a spinning solution by adding lignin, a carrier polymer and a carbon material to a solvent; and a step of preparing the ultrafine fiber by spinning the spinning solution.

In an embodiment, the step of preparing the ultrafine fiber by spinning the spinning solution may be performed by electrospinning.

In an embodiment, the method for preparing an ultrafine fiber may further include, after preparing the ultrafine fiber, a step of insolubilizing the ultrafine fiber.

Because the lignin contained in the lignin-containing coating composition according to an embodiment of the present disclosure has a phenol structure exhibiting antibacterial property, the coating composition may have antibacterial property and may be used as a coating agent in various composite materials.

Also, the coating composition may have superior conductivity, biodegradability, etc. and may be used in various fields, e.g., a functional paint additive a nanocomposite additive, an intercalating agent, a filler, etc. due to superior dispersibility. In addition, when the coating composition further contains a viscous polymer, it may be used as an ink or a paste in various fields for, e.g., anti-fouling, antibacterial, anti-corrosion and anti-wearing purposes.

Since the coating composition can be prepared through a simple and economical process, the coating composition can be produced at low cost.

The ultrafine fiber according to another embodiment of the present disclosure, which contains lignin, can exhibit the properties of lignin such as antibacterial property, biodegradability, etc. Accordingly, it can be used widely in medical materials such as nanofiber, nanofiber web, nanofiber sheet, etc. for wound healing of the skin's dermal layer, underwear where microorganisms can inhabit easily due to high humidity, summer clothes which easily get wet with sweat, etc. In addition, the ultrafine fiber can be used in sheath of electric cables because it contains a carbon material. Moreover, because the ultrafine fiber can hold a large quantity of water, i.e. high hygroscopy, it can be used in various fields including sanitary pads for women, diapers for babies and adults, etc.

DETAILED DESCRIPTION

Figure 1:
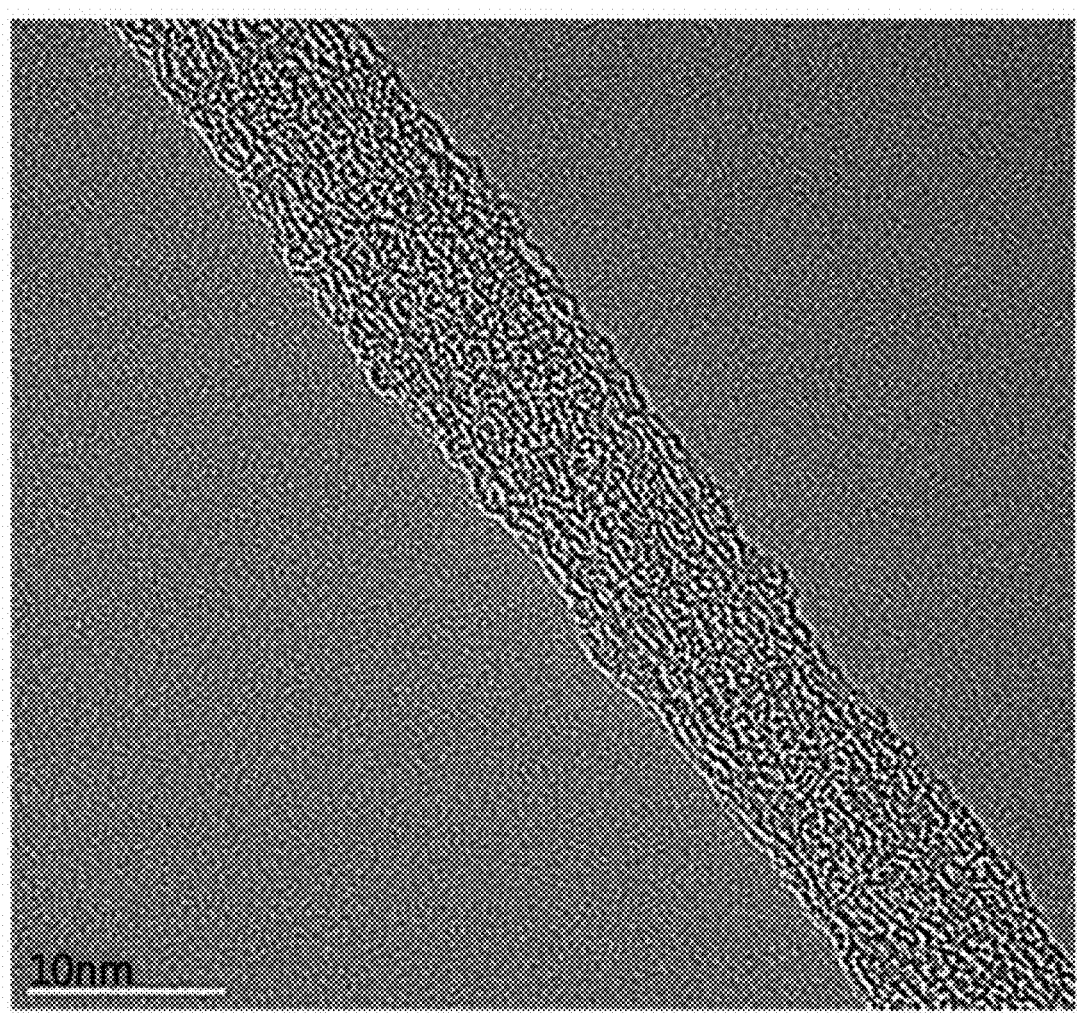
FIG. 1 shows a transmission electron microscopic (TEM) image of a coating composition prepared according to an embodiment of the present disclosure.
Figure 2A:
FIGS. 2a-2g show a photographic image (2a), scanning electron microscopic (SEM) images (2b-2d), a UV-Vis spectrum (2e) and Turbiscan images (2f-2g) of a coating composition prepared according to an embodiment of the present disclosure.
Figure 2B:
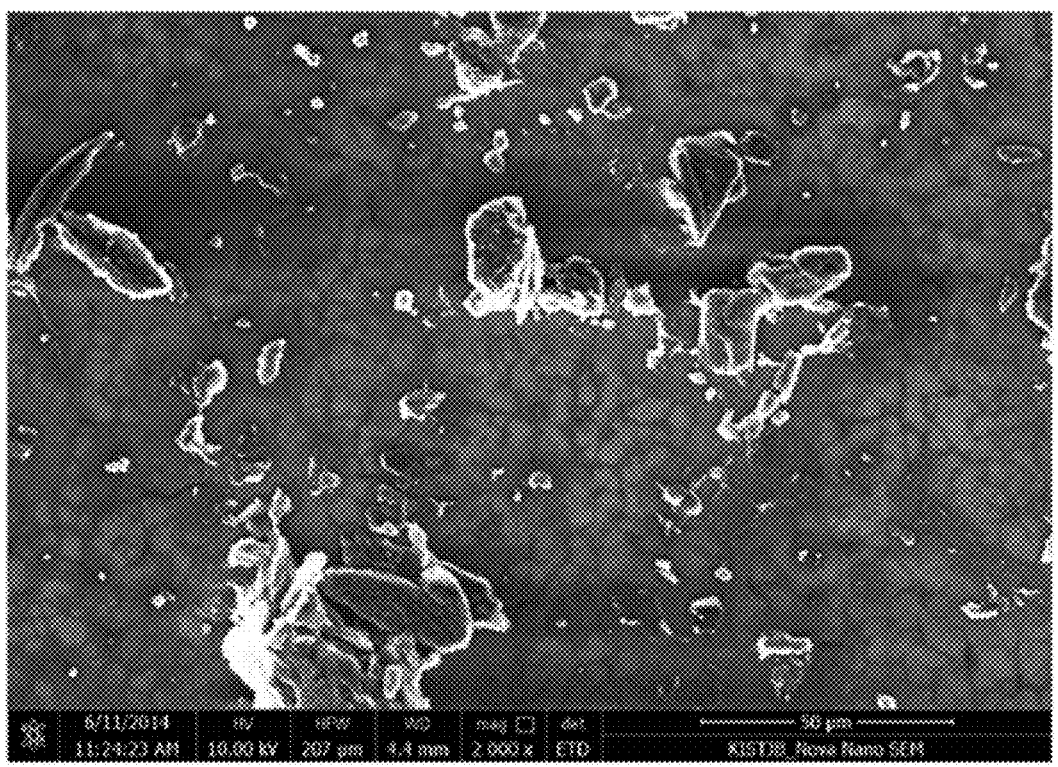
Figure 2C:
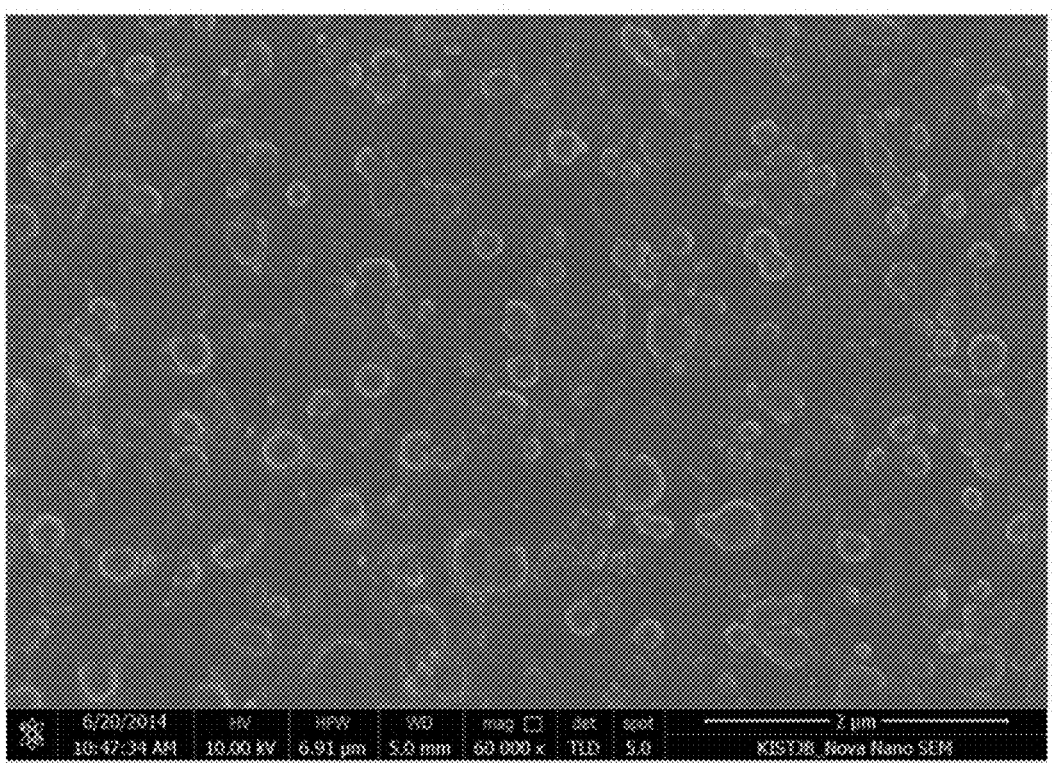
Figure 2D:
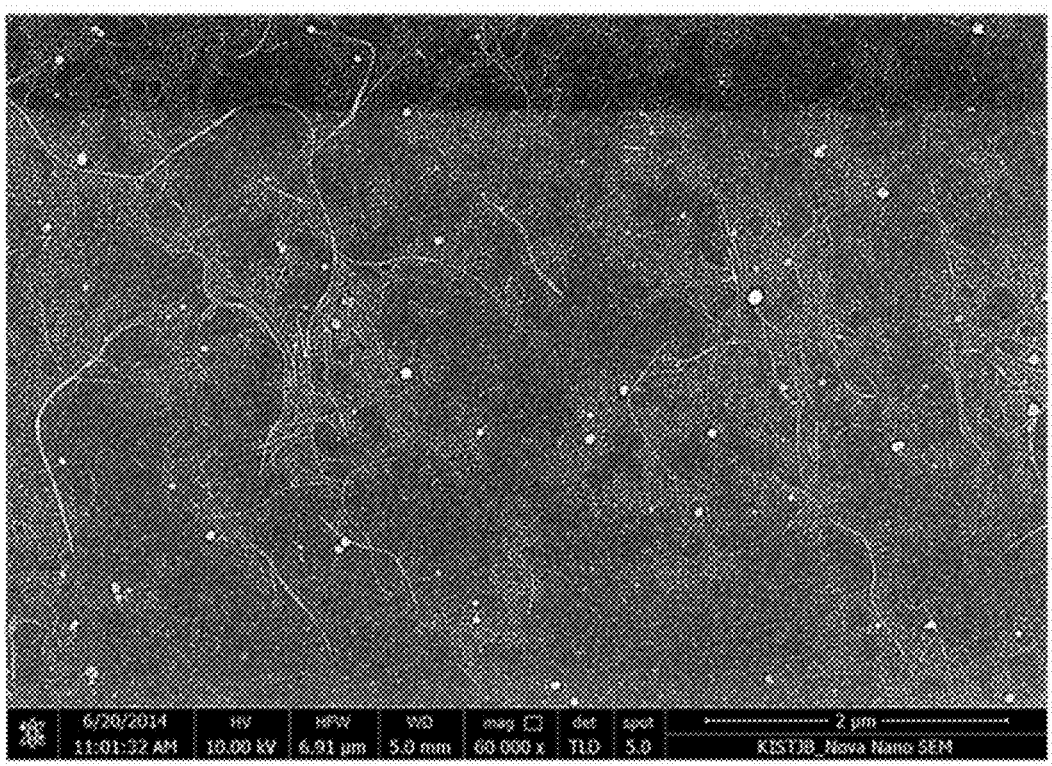
Figure 2E:
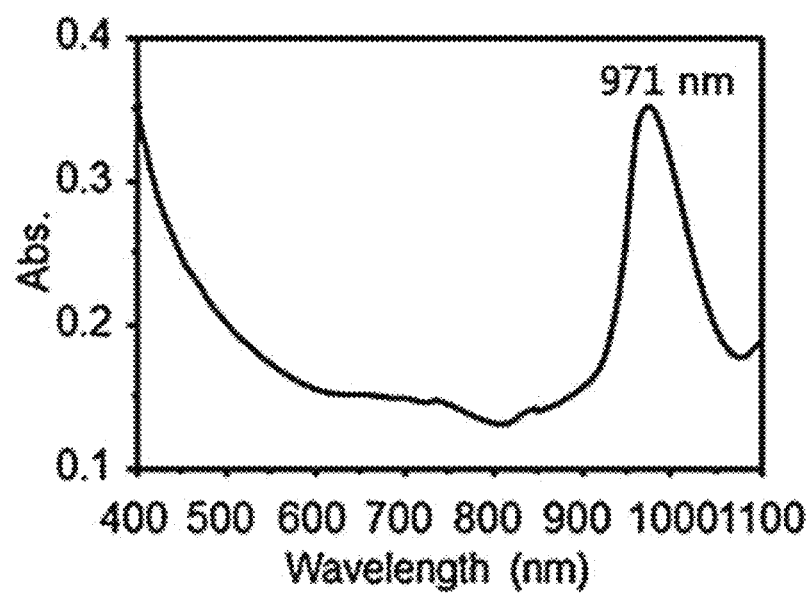
Figure 2F:
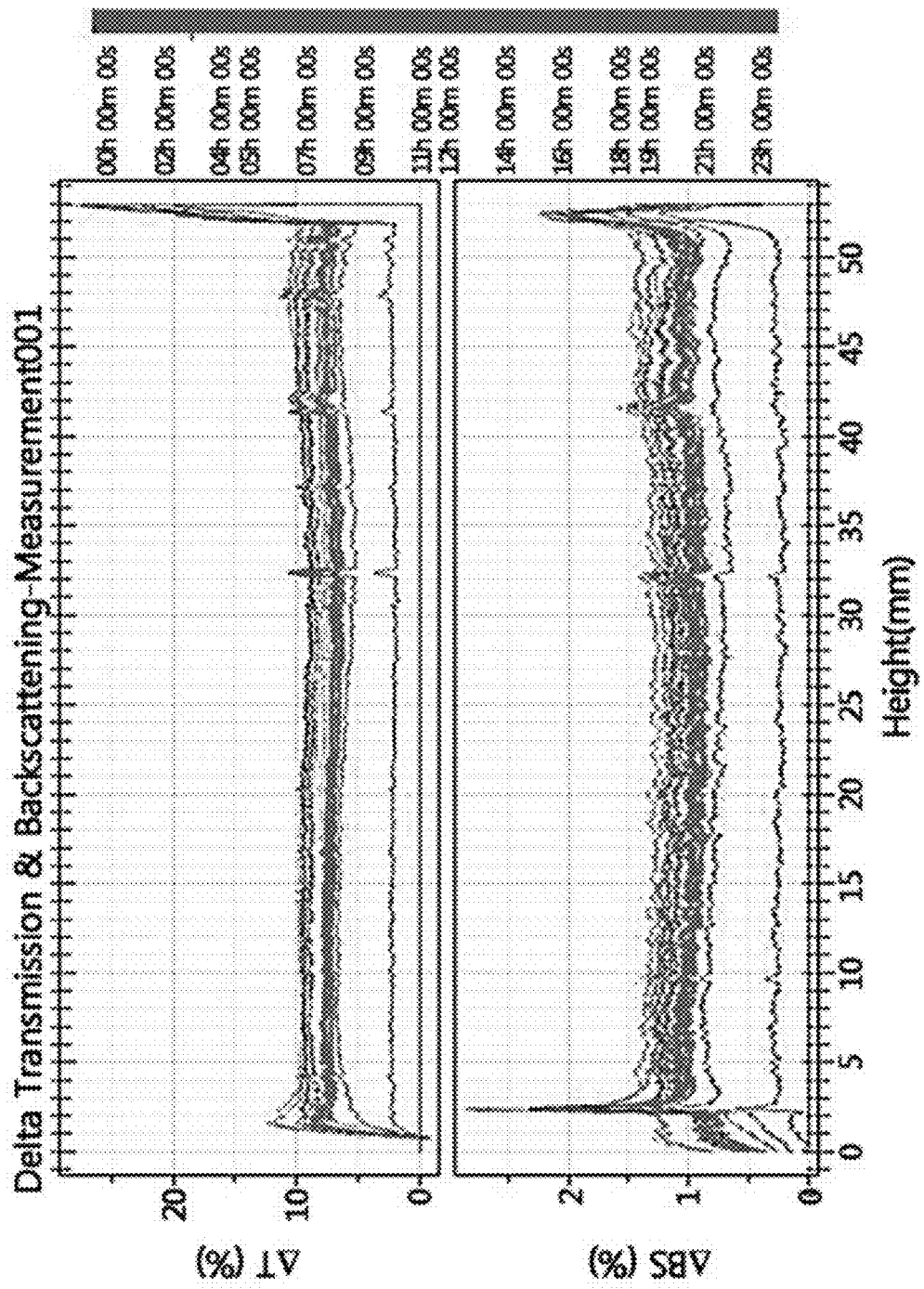
Figure 2G:
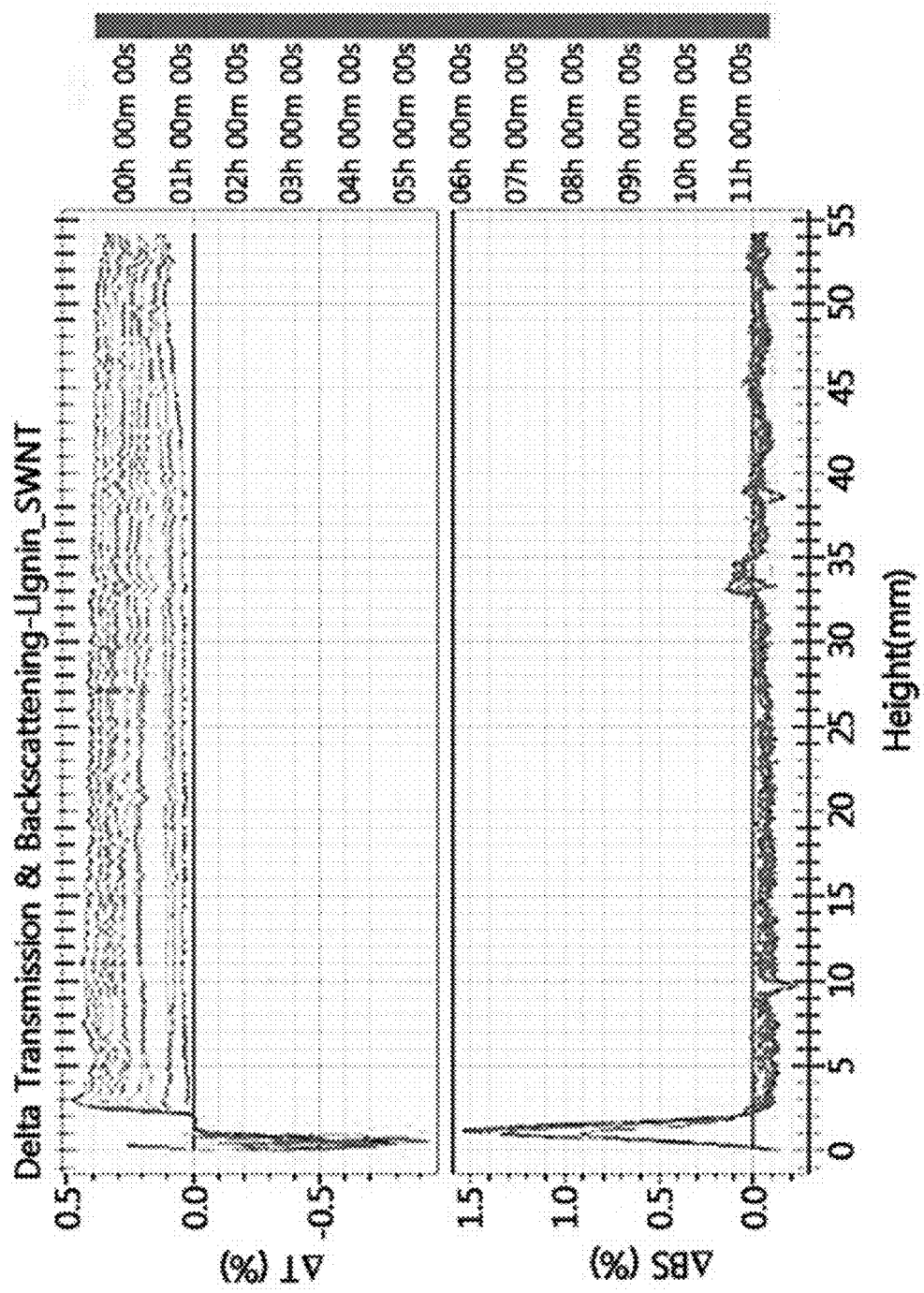

In the present disclosure, an ultrafine fiber refers to a fiber which is 3 micrometers or smaller in diameter. For example, a single strand of an ultrafine nanofiber may have a diameter of 100-3000 nm.

In the present disclosure, carbon nanotube refers to a material wherein carbon atoms are arranged hexagonally and form a cylindrical structure.

In the present disclosure, a carrier polymer refers to a polymer material which increases the viscosity of a spinning solution when a fiber is prepared.

In the present disclosure, polyvinyl alcohol refers to a substance prepared from a polyvinyl alcohol precursor (e.g., a polyvinyl acetate copolymer), which has a varying degree of saponification.

In the present disclosure, an organic binder refers to a polymer material which can provide viscosity when added to a composition, etc.

In the present disclosure, a hygroscopic polymer refers to a polymer compound which is capable of absorbing a fluid. In particular, it refers to a polymer compound with superior hygroscopy which is expandable or hydrophilic. It may be used in diapers, sanitary pads, aromatics, heating pads, hydroculture of plants, etc. as well as in afforestation of desert.

Hereinafter, embodiments of the present disclosure are described in detail referring to the attached drawings. Although the embodiments of the present disclosure are described referring to the attached drawings, they are provided for the purpose of illustration only and the technical idea, composition and application of the present disclosure is not limited by them.

Coating Composition and Method for Preparing the Same

A coating composition according to an embodiment of the present disclosure may contain lignin and a carbon material.

Because the coating composition contains lignin having antibacterial property and a carbon material, the coating composition may also have superior antibacterial property. The coating composition may exhibit superior biodegradability due to the biodegradability of lignin. In addition, the coating composition may exhibit superior conductivity due to the widely dispersed carbon material.

Hereunder is given a more detailed description.

In an embodiment, the carbon material of the coating composition may include one or more selected from a group consisting of carbon nanotube, graphene, fullerene, boron nitride (BN) nanotube, graphite, expanded graphite, carbon fiber, carbon black and carbon (C).

In an embodiment, the carbon material may include carbon nanotube and the carbon nanotube may include one or more selected from a group consisting of single-walled carbon nanotube, double-walled carbon nanotube and multi-walled carbon nanotube.

In an embodiment, the carbon material may be coated with the lignin. The lignin may increase the dispersibility of the carbon material. Accordingly, the coating composition may have improved dispersibility.

In an embodiment, the lignin may be coated on the carbon material with a thickness of 1-20 nm. When the coating thickness is smaller than 1 nm, the dispersibility of the carbon material in the coating composition may be unsatisfactory. And, when the coating thickness exceeds 20 nm, the performance of the coating composition may be unsatisfactory.

In an embodiment, a weight ratio of the lignin and the carbon material may be 200:1 to 3:2. When the ratio is smaller than 200:1, the dispersibility of the carbon material may be unsatisfactory. And, when it exceeds 3:2, the performance of the coating composition may be unsatisfactory.

In an embodiment, the coating composition may further contain an organic binder. When the coating composition contains the organic binder, the viscosity of the coating composition may be improved. In this case, the coating composition may be used as a paste, etc.

In an embodiment, the organic binder may include one or more selected from a group consisting of ethyl cellulose, polyurethane, epoxy, nitrocellulose, phenol resin, polyester, polyvinyl, urea resin, polyethylene resin, acryl resin, silicone resin or a mixture thereof.

In an embodiment, 0.000001-9.99 parts by weight of the organic binder may be contained based on 100 parts by weight of the coating composition.

The coating composition may be obtained by a method for preparing a coating composition, which includes: a step of preparing a dispersion by adding lignin and a carbon material to a solvent; and a step of preparing the coating composition by ultrasonicating the dispersion. Regarding the description about the method for preparing a coating composition, those the same as or similar to the foregoing description of the coating composition will be omitted.

First, a dispersion is prepared by adding lignin and a carbon material to a solvent. Specifically, the dispersion may be prepared by adding lignin and a carbon material to a reaction container holding a solvent and mixing them.

In an embodiment, the solvent may include one or more solvent having a hydroxy (—OH) functional group such as distilled water, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone cyclohexanone, toluene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol diethyl ether, terpineol, etc.

Then, a coating composition containing a lignin-coated carbon material is formed by ultrasonicating the dispersion. During the ultrasonication, the lignin may be coated on the carbon material.

In an embodiment, the ultrasonication may be performed via at least two steps. Specifically, the ultrasonication may include a step using a bath-type sonicator and a step using a horn-type sonicator. The bath-type sonicator may serve to uniformly coat the lignin on the carbon material and the horn-type sonicator may serve to disentangle the bundle structure of the carbon material.

Through this very simple and economical process, a coating composition having superior dispersibility, conductivity and antibacterial property can be prepared.

Ultrafine Fiber and Method for Preparing the Same

An ultrafine fiber according to an embodiment of the present disclosure may include lignin, a carrier polymer and a carbon material.

Hereunder is given a more detailed description.

In general, a fiber is formed by spinning a spinning solution, whereby the components of the spinning solution are crosslinked. If the crosslinkage is not formed properly, the physical properties of the fiber may be unsatisfactory. In addition, the physical properties of the fiber may deteriorate in an insolubilizing step that follows the preparation of the fiber.

The ultrafine fiber according to an embodiment of the present disclosure may include lignin, a carrier polymer and a carbon material. During the preparation of the ultrafine fiber, the carbon material may enhance the physical properties of the fiber by forming stronger crosslinkage with the carrier polymer and the lignin. In addition, the carbon material can maintain the physical properties of the fiber during the insolubilizing step.

The ultrafine fiber exhibits antibacterial property because it includes the lignin. When it includes the carbon material, superior antibacterial property may be exhibited even at a low concentration of the lignin.

In an embodiment, the lignin may have a molecular weight of 2,000-40,000, specifically 20,000-40,000.

In an embodiment, the lignin may be alkaline lignin (lignin with a low sulfonate content).

In an embodiment, the lignin and the carbon material may be bound to the carrier polymer and, specifically, may be present in the carrier polymer. Also, the lignin, the carbon material and the carrier polymer may form crosslinkage with each other and, accordingly, the ultrafine fiber may have improved crosslinkage.

In an embodiment, the carbon material may include one or more material made of carbon (C) selected from a group consisting of carbon nanotube, graphene, fullerene, boron nitride (BN) nanotube, graphite, expanded graphite, carbon fiber, carbon black, etc.

In an embodiment, the carbon material may include carbon nanotube and the carbon nanotube may include one or more selected from a group consisting of single-walled carbon nanotube, double-walled carbon nanotube and multi-walled carbon nanotube.

In an embodiment, when the carbon material is carbon nanotube, it may have a diameter of about 1-100 nm. When the carbon material is carbon nanotube, the ultrafine fiber may have improved antibacterial property.

Specifically, the carbon material may damage and deactivate the cell membrane of microorganisms by directly contacting with the microorganisms. Therefore, the carbon material may exhibit antibacterial property.

In particular, when carbon nanotube is used as the carbon material, the carbon nanotube can effectively and directly contact with bacteria, pathogens, etc. due to its structural characteristics such as high aspect ratio, nanometer-sized diameter, micrometer-sized length, etc. Accordingly, the carbon nanotube can exhibit antibacterial property more effectively by severely damaging the cell wall, thereby killing cells or exerting oxidative stress.

In an embodiment, the carbon nanotube may be multi-walled carbon nanotube when considering the production cost of the final product, etc.

In an embodiment, the carrier polymer is a material used to spin the lignin and the carbon nanotube and may include one or more selected from a group consisting of hyaluronic acid, alginic acid, pectin, carrageenan, chondroitin sulfate, dextran sulfate, chitosan, polylysine, collagen, gelatin, carboxymethyl chitin, fibrin, dextran, agarose, pullulan, polyacrylamide (PAAm), poly(N-isopropylacrylamide-co-acrylic acid) (P(NIPAAm-co-AAc)), poly(N-isopropylacrylamide-co-ethyl methacrylate) P(NIPAAm-co-EMA), polyvinyl acetate/polyvinyl alcohol (PVAc/PVA), poly(N-vinylpyrrolidone) (PVP), poly(methyl methacrylate-co-hydroxyethyl methacrylate) (P(MMA-co-HEMA)), poly(polyethylene glycol-co-peptide) (P(PEG-co-peptide)), alginate-g-(polyethylene oxide-polypropylene oxide-polyethylene oxide) (alginate-g-(PEOPPO-PEO)), poly(polylactic-co-glycolic acid-co-serine) (P(PLGA-co-serine)), collagen acrylate, alginate-acrylate, poly(hydroxypropyl methacrylamide-g-peptide) (P(HPMA-g-peptide)), poly(hydroxyethyl methacrylamide/Matrigel) (P(HEMA/Matrigel)), hyaluronic acid-g-N-isopropylacrylamide (HA-g-NIPAAm), polyethylene oxide (PEO), a polyethylene oxide-polypropylene oxide copolymer (PEO-PPO, Pluronic series), a polyethylene oxide-polylactic acid copolymer (PEO-PLA), a polyethylene oxide-polylacticglycolic acid copolymer (PEO-PLGA), a polyethylene oxide-polycaprolactone copolymer (PEO-PCL), a polyoxyethylene alkyl ether (Brij series), a polyoxyethylene castor oil derivative (Cremophores), a polyoxyethylene sorbitan fatty acid ester (Tween series) and polyoxyethylene stearate.

Specifically, in an embodiment, one or more selected from a group consisting of polylactic acid (PLA), polyglycolic acid (PGA), a poly(lactic-co-glycolic acid) (PLGA) copolymer and a mixture thereof, which are approved by the US Food and Drug Administration (FDA) as biodegradable polymers that can be used for the human body, may be used as the carrier polymer. The biodegradable polymer may have a weight-average molecular weight of 5,000-2,000,000, more specifically 10,000-700,000, although not being necessarily limited thereto.

In an embodiment, chitosan may be used as the carrier polymer which is soluble in water. Chitosan collectively refers to a deacetylation product of chitin found in the exoskeletons of shrimp or crab. It is the most abundant natural polymer material on earth, next to cellulose. Recently, as the biocompatibility, antibacterial property, biodegradability and metal ion adsorbing property of chitin and chitosan are known, they are used and actively studied in fibrous polymer industry, medical engineering, medicine, agriculture and forestry. In particular, bio-derived polymers such as chitosan are advantageous in that they are free from foreign body reactions in the human body and can ensure safety because their degradation products lack toxicity.

The ultrafine fiber may further include a hygroscopic polymer. In this case, the hygroscopy of the ultrafine fiber may be enhanced further.

In an embodiment, one or more selected from a group consisting of starch-based resin, cellulose-based resin, polyacryl-based resin, gelatin, polysaccharide-based resin, etc. may be used as the hygroscopic polymer.

In an embodiment, the carbon material may improve crosslinkage during when the ultrafine fiber is insolubilized. Accordingly, the ultrafine fiber may have a very small thickness. It may have a thickness of specifically 150-3000 nm, more specifically 150-2500 nm, further more specifically 160-2300 nm.

In an embodiment, the ultrafine fiber may be formed from spinning of a spinning solution containing the lignin, the carrier polymer and the carbon material.

In an embodiment, the ultrafine fiber may have superior hygroscopy, antibacterial property, conductivity and biodegradability.

When the carbon material is carbon nanotube, the antibacterial property of the ultrafine fiber may increase with the concentration of the carbon nanotube.

A method for preparing an ultrafine fiber according to an embodiment of the present disclosure may include: a step of preparing a spinning solution by adding lignin, a carrier polymer and a carbon material to a solvent; and a step of preparing the ultrafine fiber by spinning the spinning solution.

Hereunder is given a more detailed description.

First, a spinning solution is prepared by adding a carrier polymer, lignin and a carbon material to a solvent.

In an embodiment, the solvent may include one or more solvent having a hydroxy (—OH) functional group such as distilled water, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, cyclohexanone, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol diethyl ether, terpineol, etc.

In an embodiment, the carbon material may include one or more material made of carbon (C) selected from a group consisting of carbon nanotube, graphene, fullerene, boron nitride (BN) nanotube, graphite, expanded graphite, carbon fiber, carbon black, etc.

In an embodiment, the carbon material may include carbon nanotube and the carbon nanotube may include one or more selected from a group consisting of single-walled carbon nanotube, double-walled carbon nanotube and multi-walled carbon nanotube.

When the carbon material is carbon nanotube, it may have a diameter of about 1-100 nm. In this case, the ultrafine fiber may have improved antibacterial property.

In an embodiment, the carrier polymer is a material used to spin the lignin and the carbon nanotube and may include one or more selected from a group consisting of hyaluronic acid, alginic acid, pectin, carrageenan, chondroitin sulfate, dextran sulfate, chitosan, polylysine, collagen, gelatin, carboxymethyl chitin, fibrin, dextran, agarose, pullulan, polyacrylamide (PAAm), poly(N-isopropylacrylamide-co-acrylic acid) (P(NIPAAm-co-AAc)), poly(N-isopropylacrylamide-co-ethyl methacrylate) P(NIPAAm-co-EMA), polyvinyl acetate/polyvinyl alcohol (PVAc/PVA), poly(N-vinylpyrrolidone) (PVP), poly(methyl methacrylateco-hydroxyethyl methacrylate) (P(MMA-co-HEMA)), poly (polyethylene glycol-co-peptide) (P(PEG-co-peptide)), alginate-g-(polyethylene oxide-polypropylene oxide-polyethylene oxide) (alginate-g-(PEOPPO-PEO)), poly(polylactic-co-glycolic acid-co-serine) (P(PLGA-co-serine)), collagen acrylate, alginate-acrylate, poly (hydroxypropyl methacrylamide-g-peptide) (P(HPMA-g-peptide)), poly(hydroxyethyl methacrylamide/Matrigel) (P(HEMA/Matrigel)), hyaluronic acid-g-N-isopropylacrylamide (HA-g-NIPAAm), polyethylene oxide (PEO), a polyethylene oxide-polypropylene oxide copolymer (PEO-PPO, Pluronic series), a polyethylene oxide-polylactic acid copolymer (PEO-PLA), a polyethylene oxide-polylacticglycolic acid copolymer (PEO-PLGA), a polyethylene oxide-polycaprolactone copolymer (PEO-PCL), a polyoxyethylene alkyl ether (Brij series), a polyoxyethylene castor oil derivative (Cremophores), a polyoxyethylene sorbitan fatty acid ester (Tween series) and polyoxyethylene stearate.

In an embodiment, the carrier polymer may be specifically one or more selected from a group consisting of polyvinyl alcohol (PVA), polylactic acid (PLA), polyglycolic acid (PGA), a poly(lactic-co-glycolic acid) (PLGA) copolymer and a mixture thereof. Chitosan may be used as the carrier polymer which is soluble in water.

In an embodiment, a weight ratio of the lignin, the carrier polymer and the carbon material may be 1:0.001:1 to 1:0.01:1.

The spinning solution may further contain a hygroscopic polymer. In this case, the produced ultrafine fiber may have improved hygroscopy.

In an embodiment, one or more selected from a group consisting of starch-based resin, cellulose-based resin, polyacryl-based resin, gelatin, polysaccharide-based resin, etc. may be used as the hygroscopic polymer.

Then, the ultrafine fiber is prepared by spinning the spinning solution (step 2).

Specifically, the ultrafine fiber may be prepared by spinning the spinning solution at room temperature.

In an embodiment, the spinning may be performed by electrospinning, melt blowing, flash spinning, electrospraying, solution blow spinning, electroblowing, etc.

A nanofiber web may be formed when the spinning is performed by electrospinning.

Subsequently, the ultrafine fiber may be insolubilized to improve crystallinity by stabilizing structure and shape. The insolubilizing of the ultrafine fiber may be performed by water vapor treatment, photo-crosslinking or heat treatment.

In an embodiment of the present disclosure, the physical properties of the ultrafine fiber may not deteriorate even after the insolubilizing step. Accordingly, an ultrafine fiber with superior performance may be prepared.

As described above, an ultrafine fiber having superior antibacterial property, conductivity, hygroscopy, biodegradability, etc. may be prepared through a relatively simple process. Since the process is simple and economical, the final product can be produced at low cost.

Hereinafter, the present disclosure will be described in detail through examples. However, the following examples are for illustrative purposes only and the technical idea, composition and application of the present disclosure is not limited by them.

EXAMPLES 1-3

Preparation of Lignin-carbon Nanotube Coating Composition by Ultrasonic Polymerization After adding lignin and a carbon nanotube to distilled water with a ratio of 200:1 (Example 1), 40:1 (Example 2) or 3:2 (Example 3), the resulting dispersion of the lignin and the carbon nanotube in distilled water was mixed. After treating at 100 W and 4° C. for 5 hours using a bath-type sonicator (JAC-3010, Kodo Technical Research Co. Ltd., Korea) and then at 26 W and 4° C. for 3 hours using a horn-type sonicator (Vibra-cell 130, Sonics, USA), coating compositions of Examples 1-3 were obtained by treating at 4° C. and 240,000 g (49,700 rpm) for 1 hour using an ultracentrifuge. The specific compositions of the coating compositions prepared in Examples 1-3 are described in Table 1.

TABLE 1

| | Lignin (mg) | Carbon nanotube (mg) | Distilled water (mL) | Lignin:carbon nanotube |
|---|---|---|---|---|
| Example 1 | 1,000 | 5 | 50 | 200:1 |
| Example 2 | 200 | 5 | 50 | 40:1 |
| Example 3 | 7.5 | 5 | 50 | 3:2 |

TEST EXAMPLE 1

Dispersibility of Coating Composition

After taking 70% of the supernatants of the coating compositions prepared in Examples 1-3, dispersibility was determined by UV-Vis spectroscopy, scanning electron microscopy, Turbiscan, etc. The result is shown in FIG. 1 and FIGS. 2a-2g.

Specifically, FIG. 1 shows the transmission electron microscopic image of the coating composition according to an embodiment of the present disclosure. FIGS. 2a-2g show the photographic image (2a), the scanning electron microscopic (SEM) images (2b-2d), the UV-Vis spectrum (2e) and the Turbiscan images (2f-2g) of the coating composition according to an embodiment of the present disclosure.

It can be seen that, whereas the carbon nanotube is not dispersed well or the lignin polymer is partially entangled without being completely dissolved in Examples 1 and 2, the carbon nanotube is uniformly dispersed in the aqueous solution of lignin in Example 3.

Also, from the UV-Vis spectrum of Example 3, it can be seen that metallic (M11: 400-600 nm) and semiconducting (S11: 800-1600 nm, S22: 550-900 nm) carbon nanotubes are uniformly dispersed in the solution.

EXAMPLES 4-5 AND COMPARATIVE EXAMPLE 1

Preparation of Ultrafine Fibers with Different Carbon Nanotube Concentrations

Alkaline lignin (low sulfonate content; $M_w$=−10,000, Sigma Aldrich Co., USA) was used as lignin for electrospinning and polyvinyl alcohol (PVA; >99% hydrolyzed, $M_w$=89,000-98,000, Sigma Aldrich Co., USA) was used as a carrier polymer suitable for electrospinning. In order to improve antibacterial property, multi-walled carbon nanotube (MWNT; Nanosolution, Korea) with a diameter of 7-10 nm was added. Spinning solutions of Examples 4-5 were prepared using distilled water as a solvent and dispersing medium. Specifically, the solution of Example 4 had a carbon nanotube concentration of 1 wt % and the solution of Example 5 had a carbon nanotube concentration of 3 wt %.

Meanwhile, a spinning solution of Comparative Example 1 was prepared under the same condition, without using carbon nanotube.

The specific compositions of the spinning solutions of Examples 4-5 and Comparative Example 1 are described in Table 2.

TABLE 2

|  |  | Lignin (g) | CNT (g) | PVA (g) | Distilled water (mL) |
|---|---|---|---|---|---|
| Comparative Example 1 | Lignin/PVA (LNF) | 2.22 | 0 | 2.22 | 20 |
| Example 4 | Lignin/PVA/CNT (LCNF1) | 2.22 | 0.02 | 2.22 | 20 |
| Example 5 | Lignin/PVA/CNT (LCNF3) | 2.22 | 0.06 | 2.22 | 20 |

Subsequently, nanofibers of Examples 4-5 and Comparative Example 1 were fabricated by electrospinning the spinning solutions of Examples 4-5 and Comparative Example 1 under the condition of needle gauge 21, solution feed rate 8 μL/m, voltage 25 kV and spinning distance 10 cm.

TEST EXAMPLE 2

Surface Structures of Nanofibers of Examples 4-5 and Comparative Example 1

The surface of the nanofibers of Examples 4-5 and Comparative Example 1 was observed. The result is shown in FIGS. 3a-3c.

Figure 3A:
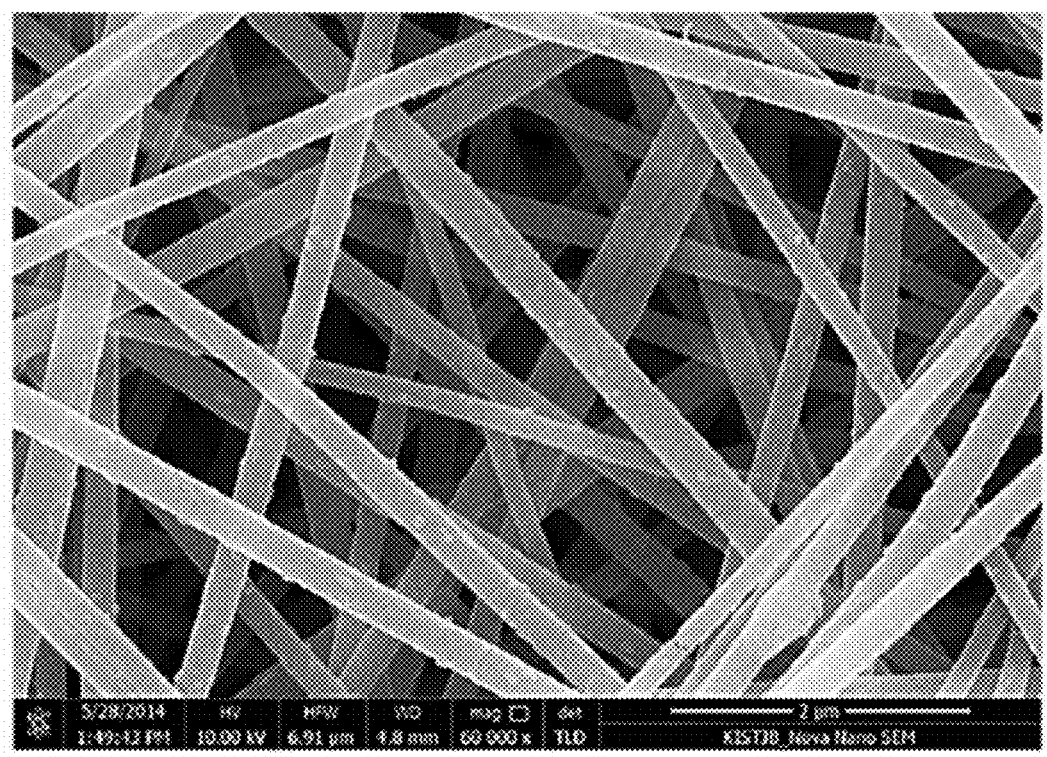
FIGS. 3a-3c show a scanning electron microscopic image of a lignin ultrafine fiber (3a) and a scanning electron microscopic image (3b) and a transmission electron microscopic image (3c) of a lignin-carbon nanotube ultrafine fiber, prepared according to an embodiment of the present disclosure.
Figure 3B:
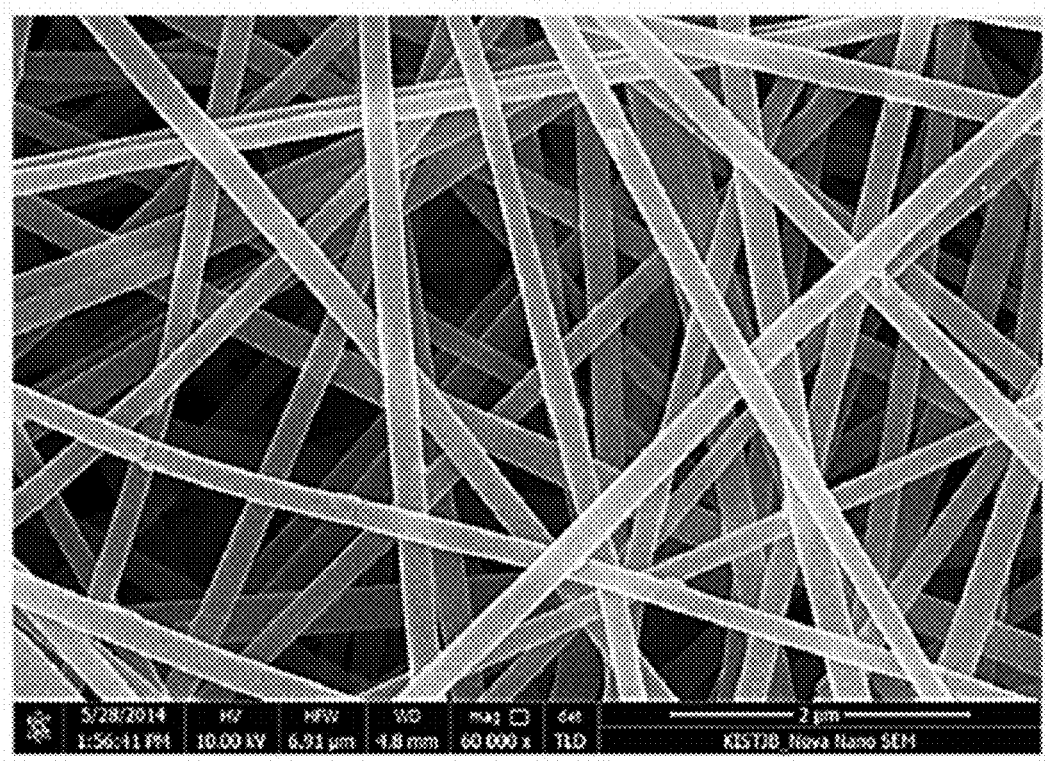
Figure 3C:
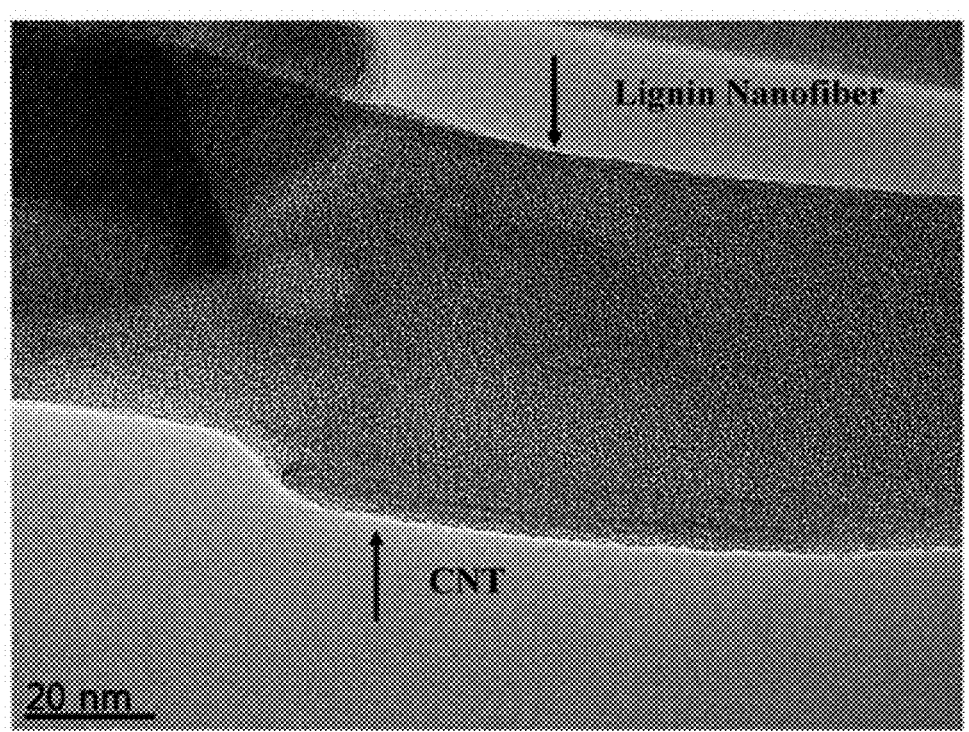

FIGS. 3a-3c show the scanning electron microscopic image of the lignin nanofiber (3a) and the scanning electron microscopic image (3b) and the transmission electron microscopic image (3c) of the lignin-carbon nanotube ultrafine fiber, according to an embodiment of the present disclosure.

FIG. 3a and FIG. 3b show the scanning electron microscopic images of the spun lignin nanofiber (Comparative Example 1) and lignin/CNT nanofiber (Example 5). It can be seen that a nanofiber with a smoother surface morphology and a smaller diameter was prepared when carbon nanotube was added. The diameter distribution of the prepared fiber was measured from the SEM images of FIG. 3a and FIG. 3b. The lignin nanofiber had an average fiber diameter of 227±49 nm and the lignin/CNT nanofiber had an average fiber diameter of 192±29 nm. That is to say, a nanofiber which is thinner and more uniform in diameter could be obtained when CNT was added.

TEST EXAMPLE 3

Water Uptake and Retention by Ultrafine Fibers

Water uptake and retention by the lignin nanofiber (Comparative Example 1) and the lignin/CNT nanofiber (Example 5) were measured. The result is shown in FIG. 4.

Figure 4:
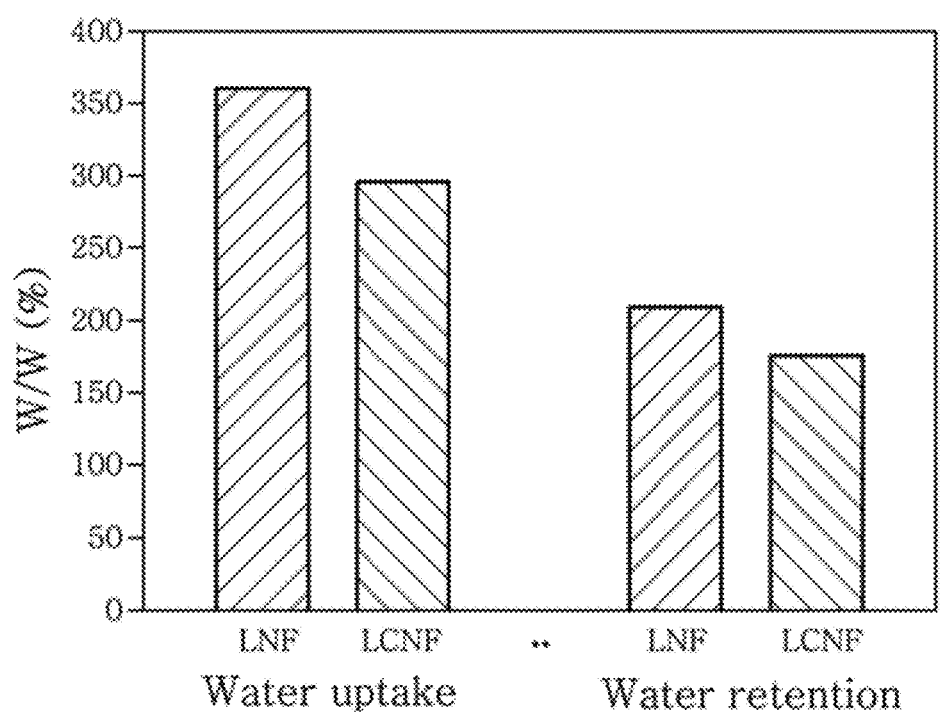
FIG. 4 shows a result of testing water uptake and retention of an ultrafine fiber according to an embodiment of the present disclosure.

FIG. 4 shows a result of testing water uptake and retention of an ultrafine fiber according to an embodiment of the present disclosure.

From FIG. 4, it can be seen that the lignin/PVA nanofiber showed water uptake and retention of 359% and 208%, whereas the lignin/PVA/CNT nanofiber showed slightly lower values of 295% and 175%, respectively. It may be due to the hydrophobic property of CNT present in the lignin/PVA/CNT nanofiber. Considering that the water uptake by the nanofiber wound dressing is 100-400%, the lignin/CNT composite nanofiber has water uptake property suitable for clothes, sanitary pads, diapers for adults and babies, etc.

TEST EXAMPLE 4

Antibacterial Property (MIC/MBC) of Ultrafine Fibers

The minimum inhibitory concentration (MIC) was measured after adding the spinning solutions of Examples 4-5 and Comparative Example 1 to *Staphylococcus aureus* cultured in liquid media. The result is shown in FIG. 5.

Figure 5:
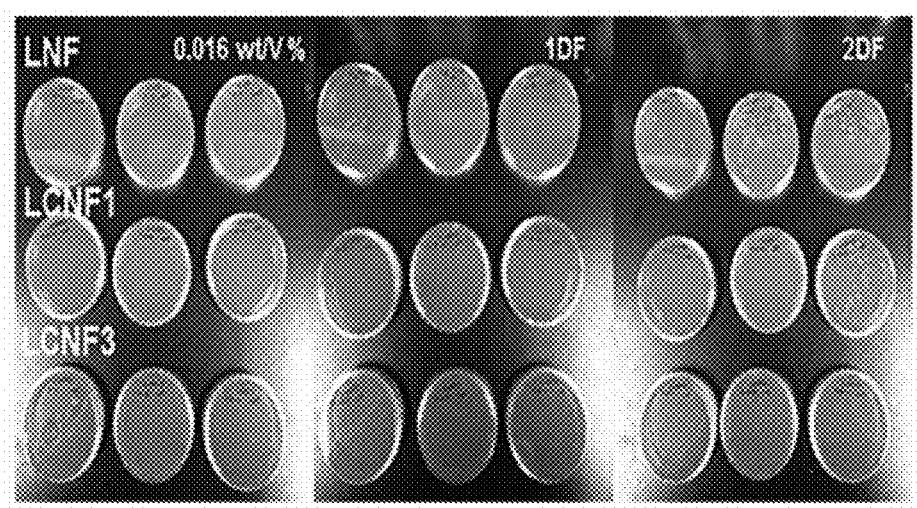
FIG. 5 shows a result of testing antibacterial property of a lignin-carbon nanotube ultrafine fiber according to an embodiment of the present disclosure.

From FIG. 5, it can be seen that the growth of *Staphylococcus aureus* was distinctly inhibited above the specified concentration. That is to say, all the spinning solutions of Examples 4-5 and Comparative Example 1 exhibited inhibitory effect against *Staphylococcus aureus* (FIG. 5).

The MIC was 1.6 mg/mL for the spinning solution of Comparative Example 1, 0.8 mg/mL for the spinning solution of Example 4 and 0.4 mg/mL for the spinning solution of Example 5. This means that the addition of CNT and the increase in the addition amount from 1 to 3 wt % lead to antibacterial activity even at low concentrations, as compared to the sample without CNT. That is to say, it can be seen that the antibacterial property can be improved by adding CNT and increasing the addition amount.

A result of measuring the minimum bactericidal concentration (MBC) after adding the spinning solutions of Examples 4-5 and Comparative Example 1 to *Staphylococcus aureus* cultured in liquid media was observed. Specifically, after diluting and adding the spinning solutions to solid media, the growth of the bacteria was observed.

It can be seen that the bacteria showed growth at the MIC of 1.6 mg/mL for the spinning solution of Comparative Example 1, suggesting that the bacteria can survive at MBC. However, the spinning solutions of Examples 4-5 showed fatality at 1.6 mg/mL and 0.8 mg/mL, respectively, at higher concentrations than MICs of 0.8 mg/mL and 0.4 mg/mL. As in the case of MIC measurement, the bactericidal activity was improved by the addition of CNT even at low concentrations.

While the embodiments have been shown and described, it will be understood by those skilled in the art that various changes in form and details may be made thereto without departing from the spirit and scope of the present disclosure as defined by the appended claims.

What is claimed is:

1. A coating composition comprising lignin and a carbon material, wherein the carbon material is coated with the lignin, the lignin is coated on the carbon material with a thickness of 1-20 nm, and a weight ratio of the lignin to the carbon material is less than 40:1 to 3:2.

2. The coating composition according to claim 1, wherein the carbon material comprises one or more selected from a group consisting of carbon nanotube, graphene, fullerene, boron nitride (BN) nanotube, graphite, expanded graphite, carbon fiber and carbon black.

3. The coating composition according to claim 2, wherein the carbon nanotube comprises one or more selected from a group consisting of single-walled carbon nanotube, double-walled carbon nanotube and multi-walled carbon nanotube.

4. The coating composition according to claim 3, wherein the carbon nanotube has a diameter of 1-100 nm.

5. The coating composition according to claim 1, wherein the coating composition further comprises an organic binder and the organic binder comprises one or more selected from a group consisting of ethyl cellulose, polyurethane, epoxy, nitrocellulose, phenol resin, polyester, polyvinyl, urea resin, polyethylene resin, acryl resin, silicone resin and a mixture thereof.

* * * * *